United States Patent [19]

Malcolm-Brown

[11] Patent Number: 4,599,369

[45] Date of Patent: Jul. 8, 1986

[54] INTUMESCENT COMPOSITION

[75] Inventor: Tessa Malcolm-Brown, Cambridge, England

[73] Assignee: Dixon International Limited, Cambridge, England

[21] Appl. No.: 659,630

[22] Filed: Oct. 9, 1984

[51] Int. Cl.⁴ .......................... C09C 5/26; C09C 5/18; C08L 21/00

[52] U.S. Cl. ................................. 523/179; 524/195; 524/442; 524/512

[58] Field of Search ................ 523/179; 524/442, 195, 524/512

[56] References Cited

U.S. PATENT DOCUMENTS

| | | | |
|---|---|---|---|
| 830,329 | 10/1905 | Kelly | 524/442 |
| 933,645 | 4/1907 | Guilleteau-Chaput | 524/442 |
| 2,103,461 | 12/1937 | Hock | 524/442 |
| 2,241,801 | 5/1941 | Yohe | 524/442 |
| 2,304,877 | 12/1942 | Birnbaum | 524/442 |
| 2,650,206 | 8/1953 | Stock | 523/179 |
| 2,806,012 | 9/1957 | Allen | 524/442 |
| 2,821,514 | 1/1958 | Sarbach | 524/442 |
| 3,654,190 | 4/1972 | Levine | 523/179 |
| 4,176,115 | 11/1979 | Hartman | 524/195 |
| 4,198,328 | 4/1980 | Bertelli | 523/179 |
| 4,341,694 | 7/1982 | Halpern | 523/179 |
| 4,486,553 | 12/1984 | Wesch . | |

FOREIGN PATENT DOCUMENTS

| | | | |
|---|---|---|---|
| 2938874 | 4/1981 | Fed. Rep. of Germany . | |
| 55-069628 | 5/1980 | Japan . | |
| 57-100963 | 6/1982 | Japan . | |
| 1095857 | 12/1967 | United Kingdom . | |
| 1408133 | 10/1975 | United Kingdom | 523/179 |
| 1601131 | 10/1981 | United Kingdom . | |
| 2095683A | 10/1982 | United Kingdom | 523/179 |
| 2147597 | 5/1985 | United Kingdom . | |

Primary Examiner—C. Warren Ivy
Attorney, Agent, or Firm—Lowe, Price, Leblanc, Becker & Shur

[57] ABSTRACT

An intumescent rubber or elastomeric composition comprises a rubber or elastomer containing:
 (a) one or more organic polyhydroxy compounds as carbonific;
 (b) one or more organic polyamido compounds in free and/or combined forms as spumific;
 (c) an ammonium phosphate as activator for the carbonific; and
 (d) an amino resin as binder; and in addition to or instead of components (a) to (d),
 (e) sodium silicate as an intumescent material, components (a) to (d) when present being intermixed with one another.

10 Claims, No Drawings

INTUMESCENT COMPOSITION

The present invention relates to an intumescent rubber or elastomeric composition Rubber and elastomeric compositions are used for many purposes and particularly in resilient seals such as sealing rings (e.g., φ-rings), gaskets and draught and smoke seals. Under fire conditions the seals char, lose their resiliency and eventually burn away. Thus the seals lose their sealing ability under fire conditions. However, at such times the retention of the sealing ability of the seals is particularly desirable so as to prevent smoke, combustion gases and fire penetrating through the space originally occupied by the seals. Also failure of the seal may in some situations allow inflammable oil, gas or other fluid to escape and be ignited. Moreover, conventional rubber or elastomeric compositions produce a large amount of thick black smoke when they burn.

There is thus a need for a rubber or elastomeric composition which at elevated temperature, as under fire conditions, is capable of acting as a fire and smoke seal and does not produce an excessive amount of black smoke.

We have discovered that by incorporating certain ingredients of a certain ingredient customarily used in intumescent materials into a rubber or elastomer, there may be obtained a rubber or elastomeric composition which is sufficiently intumescent that it at least retains its original volume on being subject to elevated temperature as under fire conditions. Thus where the composition is used as a resilient seal, when fire conditions occur the composition will, although perhaps losing its resiliency, be able to function as a fire and smoke seal.

In accordance with the present invention, there is provided an intumescent rubber or elastomeric composition comprising a rubber or elastomer containing:
(a) one or more organic polyhydroxy compounds as a carbonific;
(b) one or more organic polyamido compounds in free and/or combined forms as spumific;
(c) an ammonium phosphate as activator for the carbonific; and
(d) an amino resin as binder; and, in addition to or instead of components (a) to (d),
(e) sodium silicate as in intumescent material, components (a) to (d) when present being intermixed with one another.

The minimum amounts of ingredients (a) to (d) and/or (e) in the composition should preferably be such that on being subject to fire conditions the composition retains at least its original volume and preferably expands beyond its original shape and volume.

In general the preferred minimum total amount of components (a) to (d) and/or (e) is 2% by weight based on the composition.

The maximum amount of ingredients (a) to (d) and/or (e) in the composition should preferably be such that the composition has a sufficient resiliency for the purpose for which it is intended.

In general the preferred maximum total amount of components (a) to (d) and/or (e) is 50% by weight based on the composition.

Also preferably the composition is formulated such that on being subject to fire conditions the composition retains the ability to accommodate relative movement of parts between which it is intended that it forms a seal. To this end the composition preferably comprises components (a) to (d) referred to above.

Components (a) to (d) of the composition have the functions described below.

The carbonific (a) is a source of carbon char when subjected to heat.

The spumific (b) decomposes under fire conditions and releases gases which cause the carbon char to expand thereby to prevent the composition from contracting.

The activator (c) promotes the decomposition of the carbonific under fire conditions.

The binder (d) assists in retaining the gases released by the spumific in the composition. The binder also acts to some extent as a carbonific and spumific.

The carbonific (a) preferably comprises one or more compounds selected from mono-, di- and tripentaerythritols, sugars and starch.

The spumific (b) is preferably dicyandiamide and/or guanidine.

The activator (c) is preferably monoammonium dihydrogen phosphate (often referred to simply as monoammonium phosphate).

The ammino resin (d) is preferably ureaformaldehyde resin or more preferably melamineformaldehyde resin.

The composition may further comprise polyvinyl acetate (or a copolymer of vinyl acetate) as an additional binder.

The composition may also comprise a setting agent such as calcium sulphate.

Castor oil or other plasticizing agent may be incorporated into the composition to improve the flexibility and damp resistance of the composition.

The amino resin may be crosslinked or the composition may contain a crosslinking agent which crosslinks the amino resin at elevated temperature. Such crosslinking agent may be the polyamido compound.

The polyamido compound serving as spumific may be in free form or may be in combined form serving to crosslink the amino resin or may be partly in free form and partly serving to crosslink the amino resin.

The rubber or elastomer may contain particles individually comprising carbonific, spumific, activator and binder and/or said intumescent material, i.e., each such particle contains only one of those ingredients.

Alternatively the rubber or elastomer may contain particles each containing a plurality of those ingredients. Such particles may also contain the setting agent referred to above.

The particles referred to above may effectively form a solid phase distributed in a matrix of the rubber or elastomer or in at least one region within the rubber or elastomer. Said region may for example be encased or surrounded by the rubber or elastomer.

The rubber or elastomer may be natural rubber or a synethic rubber such as EPDM or chloroprene (available under the trade name Neoprene).

The particles preferably have a size (diameter) of less than 125 microns, more preferably less than 75 microns.

The solid phase of the composition is expediently made into fine particles by ball milling of the solid ingredients either individually or together. To inhibit particles of the materials being ball-milled from sticking together, solid $CO_2$ and/or a small amount of finely divided activated silica as an anti-cracking agent may be added to the material.

Alternatively the fine particles may be produced by disc or hammer milling.

In one aspect of the invention, components (a) to (d) and/or (e) are distributed through the rubber or elastomer.

In another aspect of the invention, components (a) to (d) and/or (e) are present in at least one region encased or surrounded by the rubber or elastomer.

The relative proportions of ingredients (a) to (d) may readily be determined by one skilled in the art of intumescent materials. The relative proportions are normally such that the ingredients (a) to (d), together with any additional binder present in the composition, would in the absence of the rubber or elastomer, be capable of producing a satisfactory intumescent material.

Our British Pat. No. 1601131 describes relative proportions of ingredients (a) to (d) and other ingredients which may be used in the present invention.

Preferred minimum amounts of components (a), (b), (c) and (d) are respectively 0.41, 1.04, 2.18 and 1.97% by weight based on the composition.

Preferred maximum amounts of components (a), (b), (c) and (d) are respectively 1.23, 3.10, 6.54 and 5.91% based on the composition.

When the rubber or elastomeric composition comprises in addition to ingredients (a) to (d), also ingredient (e), the amount of ingredient (e) in proportion to ingredients (a) to (d) is preferably as described in our copending British patent application No. 8421431.

A preferred minimum amount of sodium silicate intermixed with components (a) to (d) is 4.6 by weight based on the total ingredients (a) to (d) and a preferred maximum amount of sodium silicate intermixed with components (a) to (d) is 11.5% by weight based on the total ingredients (a) to (d).

Furthermore preferably the amount of component (e) (sodium silicate) intermixed with components (a) to (d) does not exceed 30% by weight based on component (c).

To produce the composition of the invention, the ingredients of the solid phase of the composition may be incorporated in particulate form into the rubber or eastomer at a compounding stage when preparing the composition. Alternatively the ingredients in particulate form may be incorporated into the rubber or elastomer by rolling the ingredients into calendered sheets of the rubber or elastomer. The sheets may subsequently be moulded under heat or pressure.

Seals such as referred to above may be made from the intumescent composition of the invention. Also articles, such as structural bearings, may be covered partially or wholly with the intumescent composition of the invention so that the composition forms a resilient coating or layer under normal conditions and a coating which protects against fire under fire conditions.

The invention is illustrated by the following examples.

EXAMPLE 1

An intumescent material was prepared as described in Example 1 of the complete specification of our British Pat. No. 1601131.

The intumescent material was made from the following ingredients:

| | |
|---|---|
| pentaerythritol (i.e. monopentaerythritol) | 800 g |
| dicyandiamide | 2000 g |
| monoammonium dihydrogen phosphate | 4200 g |
| water-dispersible melamine-formaldehyde resin powder | 3800 g |
| Vinapol 1070 (water-dispersible polyvinyl acetate powder) | 150 g |
| plaster of Paris | 1100 g |
| wood flour (80 mesh) | 250 g |
| water | 2400 g |

Vinapol 1070 is available from Vinyl Products Ltd., Carshalton, Surrey, England.

| | |
|---|---|
| Vinapol 1070 (water dispersible polyvinyl acetate powder) | 150 g |
| plaster of Paris | 1100 g |
| wood flour (80 mesh) | 250 g |
| water | 2400 g |

The ingredients were mixed to form a slurry, which was allowed to harden. The hardened material was roughly broken up and dried at slightly elevated temperature (100° to 110° C.) until brittle and crumbly. The material was then reduced to powder by ball milling with anti-caking agent (precipitated silica) present and sieved through a 75 micron mesh sieve to remove the wood flour. (An excessive amount of anti-caking agent was avoided as this would have reduced the degree of intumescence of the intumescent material).

About 12½ parts by weight of the resulting powdered intumescent material was incorporated into 87½ parts by weight of rubber (Neoprene) during compounding of the rubber.

We found that the resulting rubber composition could be moulded (to British standard 2752) at normal vulcanizing temperature (160° C.) without the intumescent material intumescing. This is most surprising since such intumescent material would normally intumesce at lower temperatures.

On heating the moulded rubber composition to higher temperatures by means of a Bunsen burner flame, the composition intumesces, expanding somewhat in all directions, to produce a semi-rigid intumescent material. The amount of black smoke was less than if the intumescent material had not been present.

In this example, the wood flour could have been omitted from the original formulation (and the amount of water correspondingly slightly reduced) so as to obviate the need for its subsequent removal.

It is envisaged that the ingredients, except water and wood flour, referred to above could have been omitted from the original formulation (and the amount of water correspondingly slightly reduced) so as to obviate the need for its subsequent removal.

It is envisaged that the ingredients, except water and wood flour, referred to above could have been mixed together dry in the relative proportions given above, ball milled and then incorporated into the rubber as described and that the resulting composition would have similar properties to those described.

EXAMPLE 2

Example 1 was repeated using only 8 parts of the intumescent material to 92 parts by weight of the Neoprene.

Resulting were similar to those described in Example 1.

EXAMPLE 3

Example 2 was repeated but with the addition of 5% by weight of powdered water-soluble sodium silicate ($SiO_2:Na_2O$ molar ratio 1:2) to the intumescent material before the addition of a total of 8 parts by weight of intumescent material and sodium silicate to 92 parts by weight of the Neoprene.

Results were similar to those described in Example 1, except that intumescence occurred in two stages, one stage occurring due to the presence of sodium silicate and the other stage occurring at a higher temperature due to the dicyandiamide. Such two-stage intumescence may be desirable in certain circumstances. For example, to accommodate movement between parts occurring subsequent to sealing between the parts having been effected or retained by the first stage of intumescence of the composition.

EXAMPLE 4

Example 3 was repeated but with the addition of 8% by weight of the sodium silicate to the intumescent material.

Results were similar to those described in Example 3.

Ergostab is an octyltin mercaptide stabilizer available from Ciba-Geigy and Neosil is a silica available from C. J. Crosfield, England.

EXAMPLE 5

A sheet of unvulcanized natural rubber (to BS 1154) measuring 300 mm×300 mm s×3 mm was coated with a 3 mm layer of intumescent mastic leaving a border of 40 mm uncoated rubber around the perimeter, a second similar sheet of unvulcanized rubber was placed on the top and the composite whole was placed in a mould and heated to 50° C. in order to vulcanize the rubber.

A strip 30 mm wide of the vulcanized rubber containing the intumescent mastic was cut from the sheet and heated with a Bunsen burner for a short period (about 1 minute) whereupon the rubber swelled due to the intumescent action of the central layer.

The intumescent mastic was made by mixing together the following:

| intumescent powder mix | 21 parts by weight |
| plastic binder | 12 parts by weight |
| stabilizer ("Ergostab") | ½ part by weight |
| finely divided silica ("Neosil") | ½ part by weight |

The intumescent powder mix was made by mixing together the following ingredients in powder form.

| monoammonium dihydrogen phosphate | 4200 g |
| water-dispersible melamine formaldehyde resin | 3800 g |
| dicyandiamide | 2000 g |
| pentaerythritol | 800 g |
| polyvinylacetate powder ("Vinapol") | 150 g |
| plaster of Paris | 1100 g |

The plastic binder was made by mixing together the following ingredients in powder form.

| vinyl chloride/vinyl acetate copolymer | 8 parts by weight |
| plasticizer (dioctylphthalate) | 42 parts by weight |

We claim:
1. An intumescent rubber composition comprising a rubber containing:
   (a) one or more organic polyhydroxy compounds as a carbonific in an amount of 0.41 to 1.23 by weight of the total composition;
   (b) dicyandiamide for guanidine as a spumific in an amount of 1.04 to 3.10% by weight of the total composition;
   (c) an ammonium phosphate as an activator for the carbonific in an amount of 2.18 to 6.54% by weight of the total composition; and
   (d) a melamine formaldehyde resin as a binder in an amount of 1.97 to 5.9% by weight of the total composition;
   said components (a), (b), (c) and (d) being intermixed with each other and then added to the rubber in an amount of 2 to 50% by weight of the total composition.

2. An intumescent composition according to claim 1, wherein the activator is monoammonium dihydrogen phosphate.

3. An intumescent composition according to claim 1, further comprising polyvinyl acetate as an additional binder.

4. An intumescent composition according to claim 1, wherein the rubber has distributed therethrough particles of the intermixed components (a), (b), (c), and (d).

5. An intumescent composition according to claim 4, wherein the particle size of the intermixed components is less than 125 microns.

6. An intumescent composition according to claim 4, wherein the particle size of the intermixed components is less than 75 microns.

7. An intumescent composition according to claim 1, wherein components (a) to (d) are distributed through the rubber.

8. An intumescent composition according to claim 7, wherein components (a) to (d) are present in at least one region within the rubber.

9. An intumescent composition according to claim 1, further comprising, in addition to components (a) to (d), sodium silicate in an amount of 4.6 to 11.5% by weight based on the total of ingredients (a) to (d).

10. An intumescent composition according to claim 1, wherein the amount of sodium silicate intermixed therewith does not exceed 30% by weight based on component (c).

* * * * *